(No Model.) 4 Sheets—Sheet 1.
F. GEORGE.
CONNECTION FOR LEAD AND OTHER LIKE PIPES.

No. 326,425. Patented Sept. 15, 1885.

Witnesses:
Harry Drury
John M. Clayton

Inventor:
Frank George
by his Attorneys
Howson & Sons (No Model.) 4 Sheets—Sheet 2.

F. GEORGE.
CONNECTION FOR LEAD AND OTHER LIKE PIPES.

No. 326,425. Patented Sept. 15, 1885.

Witnesses:
Harry Drury
John M. Clayton

Inventor:
Frank George
by his attorneys,
Howson & Sons (No Model.) 4 Sheets—Sheet 3.

F. GEORGE.
CONNECTION FOR LEAD AND OTHER LIKE PIPES.

No. 326,425. Patented Sept. 15, 1885.

Witnesses
Harry Drury
John McClayton

Inventor
Frank George
by his Attorneys
Howson & Sons (No Model.) 4 Sheets—Sheet 4.
F. GEORGE.
CONNECTION FOR LEAD AND OTHER LIKE PIPES.
No. 326,425. Patented Sept. 15, 1885.
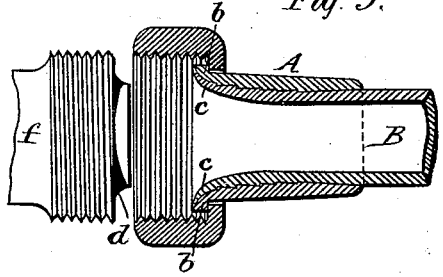
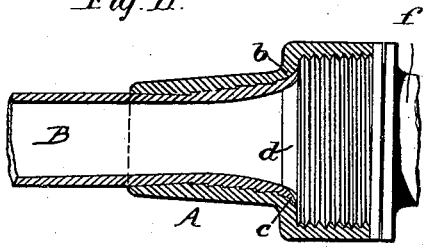
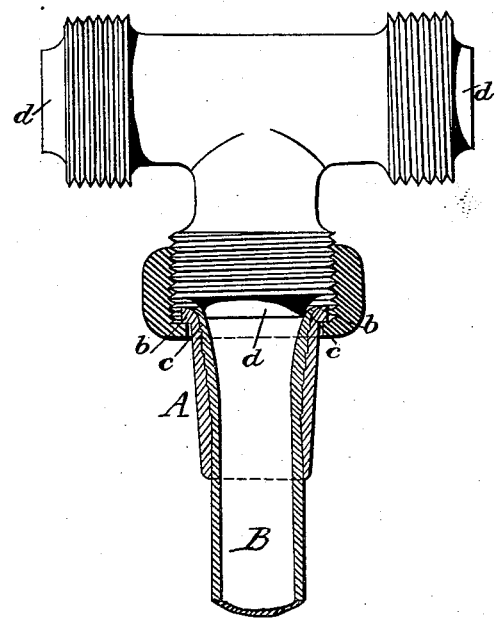
Witnesses:
Harry Drury
John M. Clayton
Inventor:
Frank George
by his attorneys
Howson & Sons

United States Patent Office.

FRANK GEORGE, OF REGENT'S PARK, COUNTY OF MIDDLESEX, ENGLAND.

CONNECTION FOR LEAD OR OTHER LIKE PIPES.

SPECIFICATION forming part of Letters Patent No. 326,425, dated September 15, 1885.

Application filed November 13, 1884. (No model.) Patented in England February 8, 1884, No. 2,984, and October 7, 1884, No. 13,284.

*To all whom it may concern:*

Be it known that I, FRANK GEORGE, brass-worker, a subject of the Queen of Great Britain and Ireland, and residing at 27 Northumberland Street, Regent's Park, in the county of Middlesex, England, have invented certain Improvements in Connections for Lead or other Like Pipes, (for which I have made applications in Great Britain, No. 2,984, dated February 8, 1884, and No. 13,284, dated October 7, 1884,) of which the following is a specification.

My invention has for its object to provide a very simple and efficient means for connecting lengths of lead or other soft-metal pipes together, or to gas-meters or other apparatus, without the necessity for using solder or a number of auxiliary parts, such as has hitherto been the practice. According to my invention I provide for each end of the pipes to be joined a sleeve-piece, technically termed a "lining," which has in its interior a double taper, so that the front and hinder portions are slightly larger than the mid portions. In the interior of each of these linings I form a number of grooves or recesses, preferably of a ratchet-tooth shape in section, the toothed or ledged part being presented toward the front part or outer end of the lining. On the end of the pipes to be joined being inserted into their linings and a taper-expander being driven into the said ends, the material of the pipes is driven into the grooves in the linings, and is caused to fill completely the interiors of the said linings with their double inclines and grooves, so that the linings are by these means firmly fixed to the said pipes.

Figure 1 represents in longitudinal section a connection for two soft-metal pipes made according to my invention. Fig. 2 is an external view of the same. Fig. 3 shows a longitudinal section of the aforesaid lining. Fig. 4 shows the same with a pipe end inserted therein preparatory to expanding it thereinto; and Fig. 5 represents one of the said linings with a screw-socket of the ordinary kind formed on it for attachment to a ball, cock, or a tap or the like. Fig. 6 illustrates pipes provided with the aforesaid linings attached to a T-piece.

The lining A, Fig. 3, is made to the gage of the pipe to be fixed therein, and is in its interior formed with a double taper—that is to say, its internal diameter is smaller in the center $x$, and widens out to a larger internal diameter at both the ends $y$ $z$. In its interior are formed hollows, grooves, or recesses $a$, preferably of ratchet-tooth form, as shown, the faces of the teeth being presented toward the end of the pipe. The said lining is passed over the end of the pipe B to be fixed in the said lining, as shown in Fig. 4, and on a tan-pin or expander being driven into the end of the pipe in the direction of the arrow, the pipe is upset or expanded and fills the interior of the said lining and the hollows, grooves, or recesses therein, and owing to these and the double taper aforesaid the said lining and pipe are firmly joined together. The said lining thus fixed to the pipe forms the means of attachment of the pipe to another pipe or the like, such as the short pipes projecting from gas-meters, or from ball cocks or valves or taps or the like. Figs. 1 and 2 show two pipes connected by means of a screwed collar or nut, or what is known as a "union coupling." The linings on each of the pipes are alike in their interiors, but of course the one has on its exterior the ordinary flange, and the other the ordinary screw necessary for the said screwed collar or nut. Fig. 5 shows the lining formed with an internally-screwed socket for attachment to a tap or other apparatus; and Fig. 6 shows three pipes fitted with linings according to my invention attached to a T-piece, it being understood that I do not limit myself to any particular means by which the linings fixed to pipes according to my invention are fixed together, or to the apparatus to which they are to be connected.

In order to render the hereinbefore-described joint perfectly tight and secure, I prefer to make the following addition thereto: The front end of one of the linings is splayed or widened out, as shown at $b$, in Fig. 7, (which is a longitudinal section of two pipes connected by linings formed according to my invention,) and over this splayed or widened-out part the extreme outer part of the material of the pipe end inserted into the said lining is spread by the expander, as shown at c. The other lining has a taper-reduced end piece at its forward part, as shown at d, which enters and bears upon the metal of the pipe splayed out at c, as aforesaid, at the end of the opposed lining. The aforesaid taper-reduced end piece, d, may be milled, roughened, or toothed on its outside, so as to bite into the soft metal of the splayed-out end c of the pipe in the opposed lining. The linings are secured together by means of a screw-collar coupling or nut, as shown, or by any other convenient means of attachment by which the two linings are forced firmly together in joining the pipes.

Fig. 9 shows a pipe and lining formed with a splayed or widened-out part, b c, as hereinbefore described, attached to a short pipe, f, projecting from the apparatus—a gas-meter, for example—to which the pipe is to be connected. The nipple-piece d is in this case formed on the said short pipe f.

Fig. 10 shows a T-piece, to which are connected pipes and linings formed with splayed or widened-out parts b c, as hereinbefore described, the nipple-pieces d in this case being formed on each end of the T-piece, to which the pipes are joined.

Fig. 11 shows a pipe and lining formed with a splayed or widened-out part, b c, as hereinbefore described, and formed with an ordinary screw-socket for receiving the short screwed pipe or projection of a ball-cock, a tap, or the like, the nipple f in this case being formed at the end of the said screwed pipe or projection.

Figure 1:
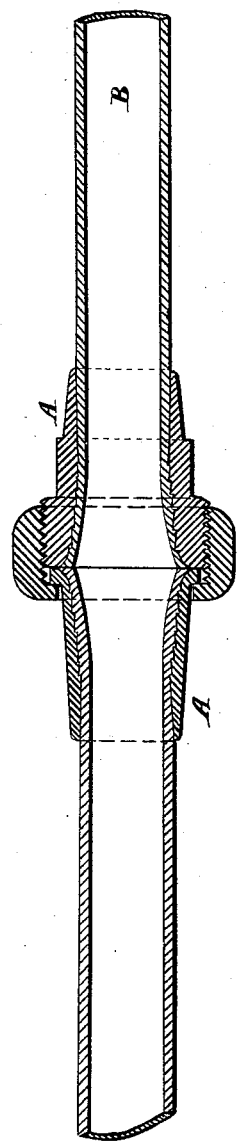
Figure 2:
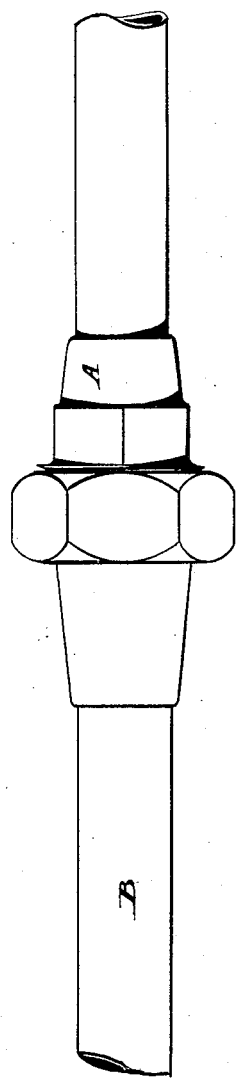
Figure 1:
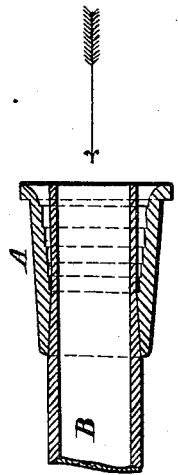
Figure 6:
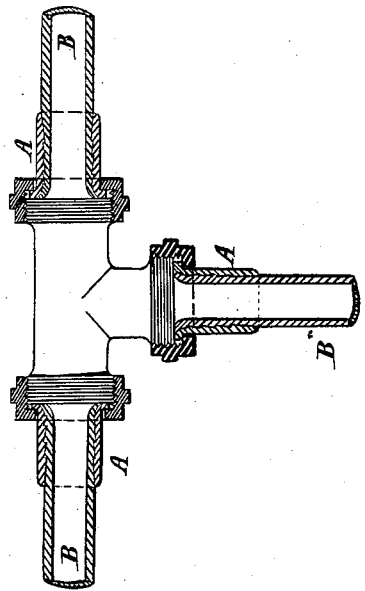
Figure 3:
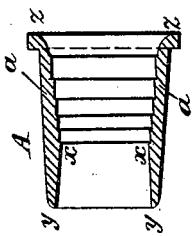
Figure 5:
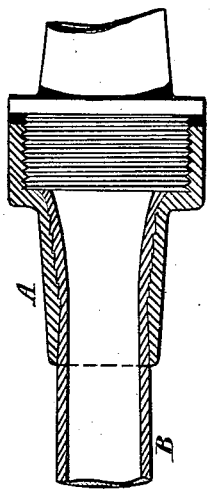
Figure 7:
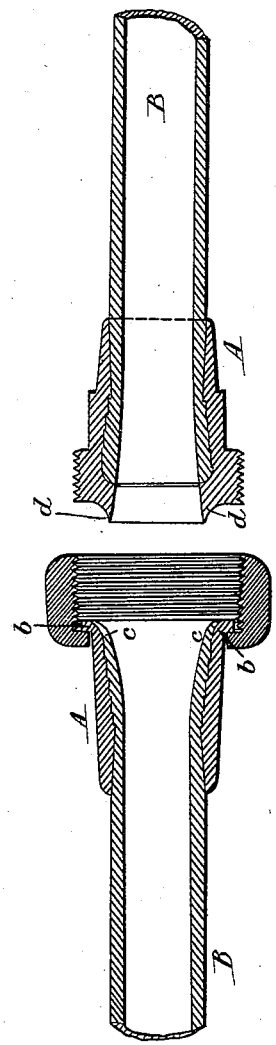
Figure 8:
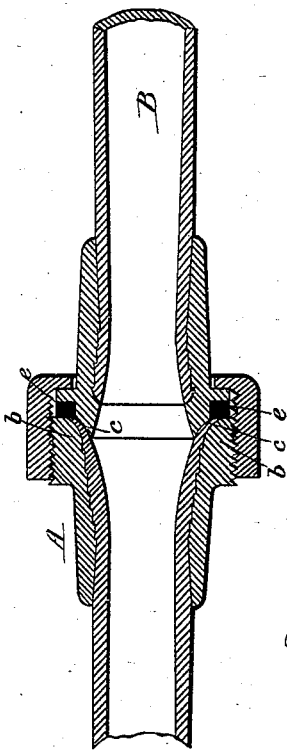
Fig. 8 is a longitudinal section of a slightly-modified form of the lining in which the flange against which the screw-collar bears is set inward to accommodate a washer, e. In joining a pipe to a gas-meter or other apparatus the one lining only may be used on the end of the pipe to be joined, the other part of the connection being formed upon or carried by the gas-meter or other apparatus.

Having now described and particularly ascertained the nature of my said invention, and in what manner the same is to be performed, I declare that what I claim is—

1. The herein-described sleeve-piece for pipe-joints, said sleeve-piece having its interior diameter tapering outward in both directions from a central point, and adapted to receive the end of a soft-metal pipe, substantially as set forth.

2. The herein-described sleeve-piece for pipe-joints, said sleeve-piece having its interior diameter tapering outward in both directions from a central point, and having recesses in said interior surface into which the end of a soft-metal pipe can be expanded, substantially as described.

3. A pipe-joint consisting of two pipe ends, each having a sleeve-piece thereon, with an interior surface tapered outward in both directions, and a coupling-collar for the adjoining pipe ends, substantially as specified.

4. The combination of lengths of soft-metal pipe with sleeve-pieces thereon, having interior surfaces tapered outward in both directions, and one of said sleeve-pieces having a widened-out end, into which its pipe is upset, and the other sleeve-piece having a conical end adapted to such upset end of the pipe, substantially as described.

In testimony whereof I have signed my name to this specification in the presence of two subscribing witnesses.

FRANK GEORGE.

Witnesses:
　CHAS. MILLS,
　CHAS. JAS. JONES.
*Both of 47 Lincoln's Inn Fields, London.*